United States Patent [19]

Noso et al.

[11] Patent Number: 4,528,687
[45] Date of Patent: Jul. 9, 1985

[54] SPOKEN-INSTRUCTION CONTROLLED SYSTEM FOR AN AUTOMOTIVE VEHICLE

[75] Inventors: Kazunori Noso, Yokosuka; Norimasa Kishi, Yokohama; Toru Futami, Yokosuka, all of Japan

[73] Assignee: Nissan Motor Company, Limited, Japan

[21] Appl. No.: 432,379

[22] Filed: Sep. 30, 1982

[30] Foreign Application Priority Data

Oct. 22, 1981 [JP] Japan .................................. 56-169172
Oct. 22, 1981 [JP] Japan .................................. 56-169173

[51] Int. Cl.³ .............................................. G10L 1/00
[52] U.S. Cl. ...................................... 381/43; 364/424
[58] Field of Search ................................. 381/41–43; 364/513, 513.5, 424

[56] References Cited

U.S. PATENT DOCUMENTS

| 4,087,630 | 5/1978 | Browning et al. | 381/43 |
| 4,100,370 | 7/1978 | Suzuki et al. | |
| 4,158,750 | 6/1979 | Sakoe et al. | |
| 4,472,617 | 9/1984 | Ueda et al. | 381/43 |

Primary Examiner—E. S. Matt Kemeny
Attorney, Agent, or Firm—Lowe, King, Price & Becker

[57] ABSTRACT

A speech recognition and actuator system for auto device control includes a recognition switch which when operated a first time activates the system to accept a spoken command, and if operated a second time within a predetermined interval T1 (approximately 2 seconds) stops the actuation and awaits a new command. Additional timers provide interval T2 for a stop command, and T3 for enabling the speech recognizer. The system may also include a reset switch when operated returns the actuated device to its original state.

14 Claims, 7 Drawing Figures

SPOKEN-INSTRUCTION CONTROLLED SYSTEM FOR AN AUTOMOTIVE VEHICLE

BACKGROUND OF THE INVENTION

1. Field of the Invention

The present invention relates generally to a spoken-instruction controlled system for an automotive vehicle, and more specifically to a system for an automotive vehicle which can immediately stop or reliably return, to the original state, a vehicle device, for instance, such as a door window opening/closing device which is being operated by a motor erroneously and dangerously in response to a driver's spoken instruction.

2. Description of the Prior Art

Conventionally, there is a well-known speech recognizer which can activate various actuators in response to human spoken instructions. When this speech recognizer is mounted on an automotive vehicle, the headlight, for instance, can be turned on or off in response to a driver's spoken instruction such as "Headlight on" or "Headlight off". The speech recognizer is very convenient because various spoken instructions can be recognized in order to control various actuators, without depressing switches; however, there are some problems involved in applying this system to an automotive vehicle.

One of the problems is as follows: in the speech recognizer, provided that a predetermined spoken instruction is uttered clearly and correctly, the system can recognize the spoken instruction accurately; however, when a spoken instruction is uttered unclearly or incorrectly or when an intense noise is included within the spoken instruction, in spite of the fact that a spoken instruction to actuate a car radio is uttered, for instance, the uttered spoken instruction is erroneously recognized and therefore a door window may be actuated and some passenger's fingers may be pinched between a moving door window and a window frame. In such a dangerous state as described above, the driver must first depress a recognition switch, next utter a spoken instruction to stop the moving door window, thirdly utter a spoken instruction to move the door window reversely, and fourthly utter a spoken instruction to stop the door window moving reversely. Additionally, after the door window stops moving reversely, the driver must utter the same spoken to actuate a car radio again correctly while depressing the recognition switch. That is to say, in the prior-art speech recognizer, there exists a problem in that in case an erroneous recognition occurs, the operation is complicated and takes much time.

A more detailed description of a typical speech recognizer or a prior-art spoken instruction controlled system will be made with reference to the attached drawing in conjunction with the present invention under DETAILED DESCRIPTION OF THE PREFERRED EMBODIMENTS.

SUMMARY OF THE INVENTION

With these problems in mind therefore, it is the primary object of the present invention to provide a spoken-instruction controlled system for an automotive vehicle which can easily be immediately stop a device, for instance, such as a door window opening/closing device which is being operated by a motor erroneously in a dangerous state due to an erroneous spoken instruction recognition; in more detail, which can stop the moving device immediately when the recognition switch is depressed again within a predetermined time period after the device has been actuated. Further, in the system according to the present invention, the system can recognize a newly-inputted spoken instruction again if a correct spoken phrase is inputted within a predetermined time period after the device moving erroneously has been stopped.

It is another object of the present invention to provide a spoken-instruction controlled system for an automotive vehicle which can automatically return, to the original position or original conditions, a device, for instance, such as a door window opening/closing device which is being operated by a motor erroneously in a dangerous state due to erroneous spoken instruction recognition; in more detail, which can first return the erroneously-moving device automatically to its original position when a reset switch is depressed within a predetermined time period after the device has been actuated.

In the spoken-instruction controlled system for an automotive vehicle according to the present invention; therefore, it is possible to facilitate a necessary action to be taken when a spoken instruction is erroneously recognized and thus a device is dangerously actuated against the driver's will.

To achieve the above-mentioned primary object, the spoken-instruction controlled system for an automotive vehicle according to the present invention comprises means for outputting a stop command signal to the vehicle actuator for a predetermined time period when the recognition switch is turned on again within another predetermined time period after the speech recognizer has outputted a recognition command signal to the vehicle device actuator and means for enabling the speech recognizer to recognize spoken instructions for another predetermined time period after the stop command signal outputting means has been disabled. The above-mentioned two means are mainly made up of a plurality of timer units, OR gates, AND gates, inverters, etc.

To achieve the above-mentioned another object, the spoken-instruction controlled system for an automotive vehicle according to the present invention further comprises a reset switch, means for storing the original operating conditions of the vehicle device actuators whenever the reset switch is turned on within a predetermined time period after the speech rcognizer has outputted a recognition command signal, and means for returning the operating conditions of the vehicle device actuator to the original operating conditions another predetermined time period after the reset switch has been turned on. The above-mentioned two means are mainly made up of a clock pulse generator, a counter, a latch circuit, a programmable subtract counter, a flip-flop etc. in the case where time interval during which the vehicle device actuator has been operated is important, for instance, in the case of a door window opening/closing device; however, in the case where on-off state in which the vehicle device actuator has been operated is important, for instance, in the case of a car-radio actuator, the above-mentioned two means are made up of a latch circuit, a decoder, etc.

BRIEF DESCRIPTION OF THE DRAWINGS

The features and advantages of the spoken-instruction controlled system for an automotive vehicle according to the present invention will be more clearly appreciated from the following description taken in conjunction with the accompanying drawings in which like reference numerals designate corresponding elements or sections throughout the drawings and in which.

DETAILED DESCRIPTION OF THE PREFERRED EMBODIMENTS

To facilitate understanding of the present invention, a brief reference will be made to the principle or operation of a typical prior-art speech recognizer, with reference to FIG. 1.

Figure 1:
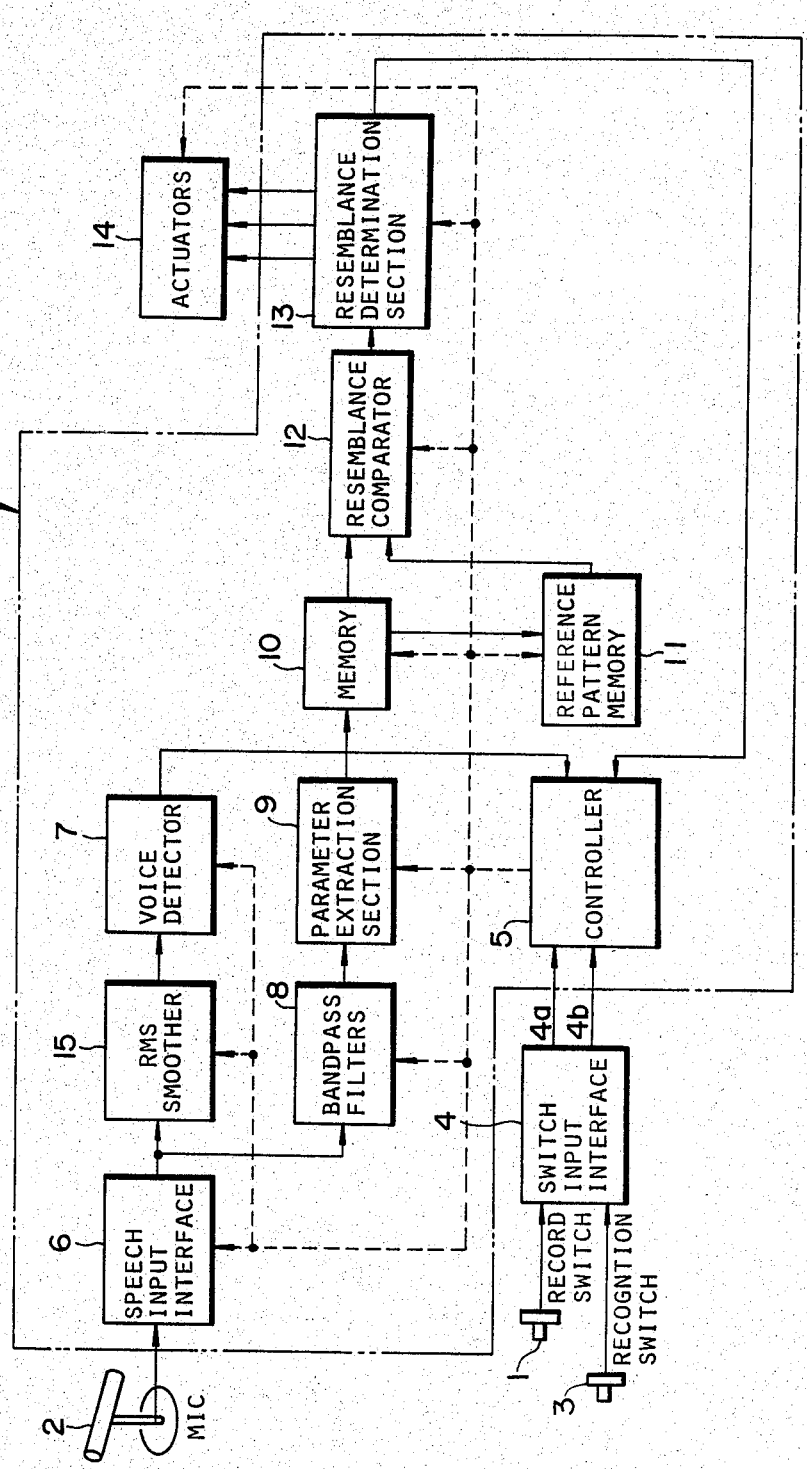
FIG. 1 is a schematic block diagram of a typical speece recognizer for assistance in explaining the operation thereof.

FIG. 1 shows a schematic block diagram of a typical speech recognizer 100. To use the speech recognizer, the user must first record a plurality of predetermined spoken instructions. Specifically, in this spoken instruction recording mode (reference mode), the user first depresses a record switch 1 disposed near the user. When the record switch 1 is depressed, a switch input interface 4 detects the depression of the record switch 2 and outputs a signal to a controller 5 via a wire 4a. In response to this signal, the controller 5 outputs a recording mode command signal to other sections in order to preset the entire speech recognizer to the recording mode. In the spoken instruction recording mode, when the user says a phrase to be used as a spoken instruction, such as "open doors", near a microphone 2, the spoken phrase is transduced into a corresponding electric signal through the microphone 2, amplified through a speech input interface 6 consisting mainly of a spectrum-normalizing amplifier, smoothed through a root-mean-square (RMS) smoother 15 including a rectifier and a smoother, and finally inputted to a voice detector 7. This voice detector 7 detects whether or not the magnitude of the spoken phrase signals exceeds a predetermined level for a predetermined period of time (150 to 250 ms) in order to determine the start of the spoken phrase input signals and whether or not the magnitude of the signals drops below a predetermined level for a predetermined period of time in order to determine the end of the signals. Upon detection of the start of the signals, this voice detector 7 outputs another recording mode command signal to the controller 5. In response to this command signal, the controller 5 activates a group of bandpass filters 8, so that the spoken phrase signal from the microphone 2 is divided into a number of predetermined frequency bands. Given to a parameter extraction section 9, the frequency-divided spoken phrase signals are squared or rectified therein in order to derive the voice power spectrum for each of the frequency bands and then converted into corresponding digital time-series matrix-phonetic pattern data (explained later). These data are then stored in a memory unit 10. In this case, however, since the speech recognizer is set to the spoken instruction recording mode by the depression of the record switch 1, the time-series matrix-phonetic pattern data are transferred to a reference pattern memory unit 11 and stored therein as reference data for use in recognizing the speech instructions.

After having recorded the reference spoken instructions, the user can input speech instructions, such as "open doors", to the speech recognizer through the microphone 2 while depressing a recognition switch 3.

When this recognition switch 3 is depressed, the switch input interface 4 detects the depression of the recognition switch 3 and outputs a signal to the controller 5 via a wire 4b. In response to this signal, the controller 5 outputs a recognition mode command signal to other sections in order to preset the entire speech recognizer to the recognition mode. In this spoken phrase recognition mode, when the user says an instruction phrase similar to the one recorded previously near the microphone 2 and when the voice detector 7 outputs a signal, the spoken instruction is transduced into a corresponding electric signal through the microphone 2, amplified through the speech input interface 6, filtered and divided into voice spectra across the frequency bands through the band pass filters 8, squared or rectified and further converted into corresponding digital time-series matrix-phonetic pattern data through the parameter extraction section 9, and then stored in the memory unit 10, in the same manner as in the recording mode.

Next, the time-series matrix-phonetic pattern data stored in the memory unit 10 in the recognition mode are sequentially compared with the time-series matrix-phonetic pattern data stored in the reference pattern memory until 11 in the recording mode by a resemblance comparator 12. The resemblance comparator 12 calculates the level of correlation of the inputted speech instruction to the reference speech instruction after time normalization and level normalization to compensate for variable speaking rate (because the same person might speak quickly and loudly at one time but slowly and in a whisper at some other time). The correlation factor is usually obtained by calculating the Tchebycheff distance (explained later) between recognition-mode time-series matrix-phonetic pattern data and recording-mode time-series matrix-phonetic pattern data. The correlation factor calculated by the resemblance comparator 12 is next given to a resemblance determination section 13 to determine whether or not the calculated values lie within a predetermined range, that is, to evaluate their cross-correlation. If within the range, a command signal, indicating that a recognition-mode spoken instruction having adequate resemblance to one of the recorded instruction phrases, is outputted to one of actuators 14 in order to open the vehicle doors, for instance. The above-mentioned operations are all executed in accordance with command signals outputted from the controller 5.

Description has been made hereinabove of the case where the speech recognizer 100 comprises various discrete elements or sections; however, it is of course possible to embody the speech recognizer 100 with a microcomputer including a central processing unit, a read-only memory, a random-access memory, a clock oscillator, etc. In this case, the voice detector 7, the parameter extraction section 9, the memory 10, the reference pattern memory 11, the resemblance comparator 12 and the resemblance determination section 13 can all be incorporated within the microcomputer, executing the same or similar processes, calculations and/or operations as explained hereinabove.

The digital time-series matrix-phonetic pattern data and the Tchebycheff distance are defined as follows:

In the case where the number of the bandpass filters is four and the number of time-series increments for each is 32, the digital recording-mode time series matrix-phonetic pattern data can be expressed as $$F(A) = f(i,j) = \begin{vmatrix} f(1,1), f(1,2), f(1,3) \ldots, f(1,32) \\ f(2,1), f(2,2), f(2,3) \ldots, f(2,32) \\ f(3,1), f(3,2), f(3,3) \ldots, f(3,32) \\ f(4,1), f(4,2), f(4,3) \ldots, f(4,32) \end{vmatrix}$$

where A designates a first recording-mode speech instruction (reference) (e.g. OPEN DOORS), i denotes the filter index, and j denotes time-series increment index.

If a first recognition-mode speech instruction (e.g. OPEN DOORS) is denoted by the character "B", the Tchebycheff distance can be obtained from the following expression:

$$l = |F(A) - F(B)| = \sum_{i=1}^{4} \sum_{j=1}^{32} |f^A(i,j) - f^B(i,j)|$$

In view of the above description and with reference to the attached drawings, the background and the embodiments of the present invention will be explained with respect to its application to a door window opening/closing device and a car-radio operating device used for an automotive vehicle.

Figure 2:
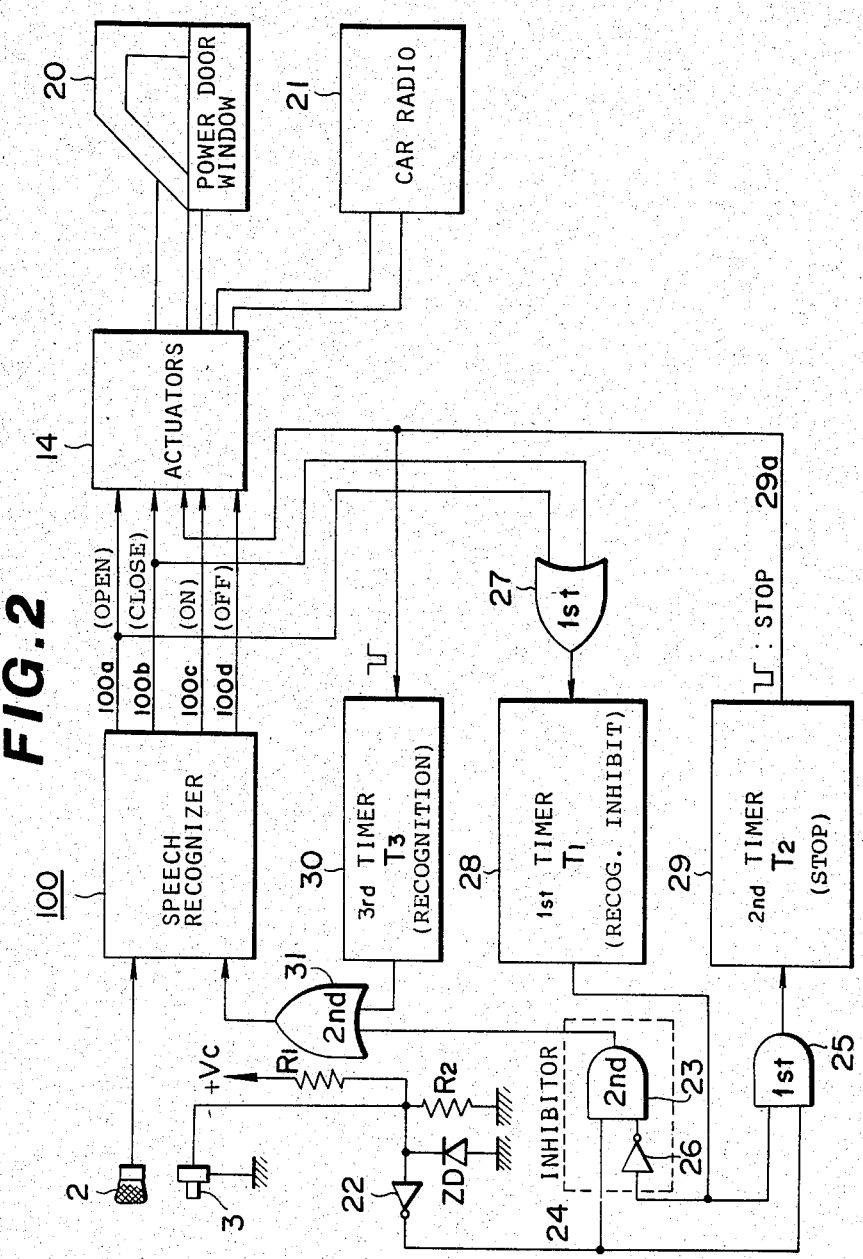
FIG. 2 is a schematic block diagram of a first embodiment of the spoken-instruction controlled system for an automotive vehicle according to the present invention, by which a door window and a car radio are actuated in response to spoken instructions.

FIG. 2 is a schematic block diagram showing a first embodiment of the present invention, by which a door window and a car radio can be actuated in response to spoken instructions and the door window can be stopped immediately from moving by depressing a recognition switch.

First, the system configuration will be described hereinbelow. In the figure, the reference numeral 2 denotes a microphone for transducing a predetermined spoken instruction uttered by the driver into an electric signal, the reference numeral 3 denotes a recognition switch such as a push-button switch turned on while a spoken instruction is uttered. To this recognition switch 3, a power supply voltage +Vc divided by two resistors $R_1$ and $R_2$ is applied. Therefore, when the recognition switch 3 is turned off, the switch output is at a logically-high voltage level; when the recognition switch 3 is turned on, a logically-low voltage level output signal is produced. Further, a zener diode ZD connected in parallel with the resistor $R_2$ serves to absorb the surge voltages generated due to chattering of the recognition switch 3.

The refrence numeral 100 denotes a speech recognizer switch compares a spoken instruction signal inputted through the microphone 2 with a plurality of previously-stored reference spoken instruction data, and outputs a command signal when the spoken instruction signal coincides with or corresponds to one of the reference data within a predetermined range.

In this embodiment, a power-operated vehicle door window 20 and a car radio 21 can be actuated. Therefore, when a spoken instruction "Open window" is recognized by the speech recognizer 100, a command signal to open the door window 20 is applied to an actuator 14 via a signal lines 100a; when "Close window" is recognized, another command signal to close the door window is applied to the actuator 14 via a signal line 100b; when "Car-radio on" is recognized, another command signal to turn on the car radio 21 is applied to the actuator 14 via a signal line 100c; when "Car-radio off" is recognized, the other command signal to turn off the car radio 21 is applied to the actuator 14 via a signal line 100d. The actuator provided with relays for actuating the door window 20 or the car radio 21 in response to these command signals from the speech recognizer 100 will be described later in more detail with reference to FIGS. 5 and 4.

On the other hand, the output of the recognition switch 3 is applied to an inverter 22. This inverter 22 outputs a L-level output signal when the recognition switch 3 is off and a H-level output signal when the recognition switch 3 is on. The output signal of the inverter 22 is given to one input terminal of a first AND gate 25 and one input terminal of a second AND gate 23 of a recognition inhibitor 24. This recognition inhibitor 24 made up of the second AND gate 23 and an inverter 26 serves to inhibit the operation of the speech recognizer 100.

The respective signal lines 100a and 100b from the speech recognizer 100 for producing the command signals for opening or closing the door window 20 are connected to the first OR gate 27 separately. The output signal of this first OR gate 27 is inputted to a first timer unit 28 for outputting a H-level signal for a predetermined time period $T_1$. When either of signal lines 100a or 100b changes to a H-level by a command signal from the speech recognizer 100, the first timer unit 28 is activated via the first OR gate 27. Therefore, the first timer unit 28 has a function to hold a command signal corresponding to the signal lines 100a and 100b for a predetermined time period $T_1$. In this embodiment, it is also possible to design the first timer unit 28 so as to keep outputting a H-level signal while either of command signals develops in either of signal lines 100a or 100b.

The output of the first timer unit 18 is applied to the second AND gate 23 via the inverter 26 of the recognition inhibitor 24 and the first AND gate 25. Therefore, a second timer unit 29 outputs a H-level signal for another predetermined time period $T_2$ when the recognition switch 3 is depressed within a predetermined time period $T_1$ after the first timer unit 28 has been actuated. When the output of this second timer unit 29 changes from a H-level to a L-level, this L-level signal is applied to the actuator 14 to stop the operation of the door window 20. Therefore, the time period $T_2$ determined by the second timer unit 29 is so preset as to be sufficient to stop the operation of the door window 20, completely.

The output of the second timer unit 29 is also applied to a third timer unit 30 for outputting a H-level signal for a predetermined time period $T_3$. This third timer unit 30 is activated by an operation-stop command signal generated when the output of the second timer unit 29 changes from a H-level to a L-level. The H-level signal from the third timer unit 30 is applied to the speech recognizer 100 via the second OR gate 31 during the predetermined time period $T_3$. Therefore, the speech recognizer 100 is enabled to operate for a predetermined time period $T_3$ after the stop command signal has been stopped from being outputted from the second timer unit 29, so that spoken instructions from the microphone 2 can be recognized.

Now, follows a description of operation of the first embodiment of the present invention shown in FIG. 2.

When the recognition switch 3 is turned on and a spoken instruction "Radio" is inputted through the microphone 2 in order to hear radio broadcasting, the output of the inverter 22 becomes a H-level as described already. On the other hand, since the first timer unit 28 is not yet activated and therefore the output thereof is at a L-level, the inverter 26 in the recognition inhibitor 24 outputs a H-level output signal. As a result, the second AND gate 23 applies a H-level signal to the speech recognizer 100 via the second OR gate 31 to enable the speech recognizer 100 to operate.

Therefore, the spoken instruction signal transduced into an electric signal through the microphone 2 to turn on the power supply of the car radio 21 is recognized in the speech recognizer 100. If recognized to be correct, a H-level command signal is produced in the signal line 100c and a power supply is supplied to the car radio 21 through the actuator 14. In contrast with this, if an erroneous recognition of a spoken instruction is made in the speech recognizer 100 for some reason such as an unclear spoken instruction, a command signal, for instance, to open the door window 20 may be developed in the signal line 100a. As a result, the actuator 14 operates so as to lower the glass of the door window 20 erroneously. In this case, the H-level command signal through the signal line 100a due to erroneous recognition of spoken instruction is inputted to the first timer unit 28 via the first OR gate 27 to activate the first timer unit 28 for a predetermined time period $T_1$ so as to output a H-level output signal. This H-level output signal from the first timer unit 28 is inverted into a L-level signal by the inverter 26 of the recognition inhibitor 24 to inhibit the H-level output signal outputted from the second AND gate 23 which would otherwise be generated when the recognition switch 3 is turned on. Therefore, when the recognition switch 3 is turned on, the speech recognizer 100 is disabled and any spoken instruction phrases are not recognized for the time period $T_1$; however, the first AND gate 25 outputs a H-level signal because the H-level output signal from the inverter 22 generated when the recognition switch 3 is turned on is inputted to the first AND gate 25, so that the second timer unit 29 is activated.

Therefore, in the case where the door window 20 is operated erroneously, if the recognition switch 3 is turned on again within the predetermined time period $T_1$ during which the first timer unit 28 is outputting a H-level signal, a H-level output signal from the inverter 22 is given to the second timer unit 29 via the first AND gate 25 to activate it, so that a L-level stop command signal is outputted over the predetermined time period $T_2$. This stop command signal (L-level) from the second timer unit 29 is given to the actuator 14 to stop the door window now in operation.

The L-level output signal from the second timer unit 29 is also given to the third timer unit 30. Since this third timer unit 30 is activated when the input changes from a H-level to a L-level, this third timer unit 30 generates a H-level output signal over the predetermined time period $T_3$. This H-level output signal from the third timer unit 30 is given to the speech recognizer 100 via the second OR gate 31 to enable the speech recognizer 14 to operate during which the third timer unit 30 is outputting a H-level output signal. Therefore, after the door window 20 has been stopped, when the same spoken instruction "Radio" for supplying a power supply to the car radio is inputted without depressing the recognition switch 3 again, this spoken instruction is recognized by the speech recognizer 100 as that this spoken instruction is the one for turning on the car radio 21. Therefore, a H-level command signal is produced through the signal line 100c to activate the actuator 14, so that a power supply is supplied to the car radio 21. In this case, it is also possible to utter a spoken instruction for closing the window.

In the system according to the present invention as described above, in the case where the device is erroneously operated in response to an erroneously recognized command signal, if the recognition switch 3 is turned on again within the time period $T_1$ (one to three seconds) predetermined by the first timer unit 28, it is possible to immediately stop the device now in operation erroneously. Additionally, when the recognition switch 3 is depressed, since the speech recognizer 100 becomes operative again in response to the stop command signal, without depressing the recognition switch 3 again, it is possible to activate the actuator 14 correctly by uttering the same instruction phrase again clearly. That is to say, it is possible to easily stop the device actuated erroneously and to input a correct spoken instruction again after the device has been stopped, by depressing the recognition switch only once.

Figure 3:
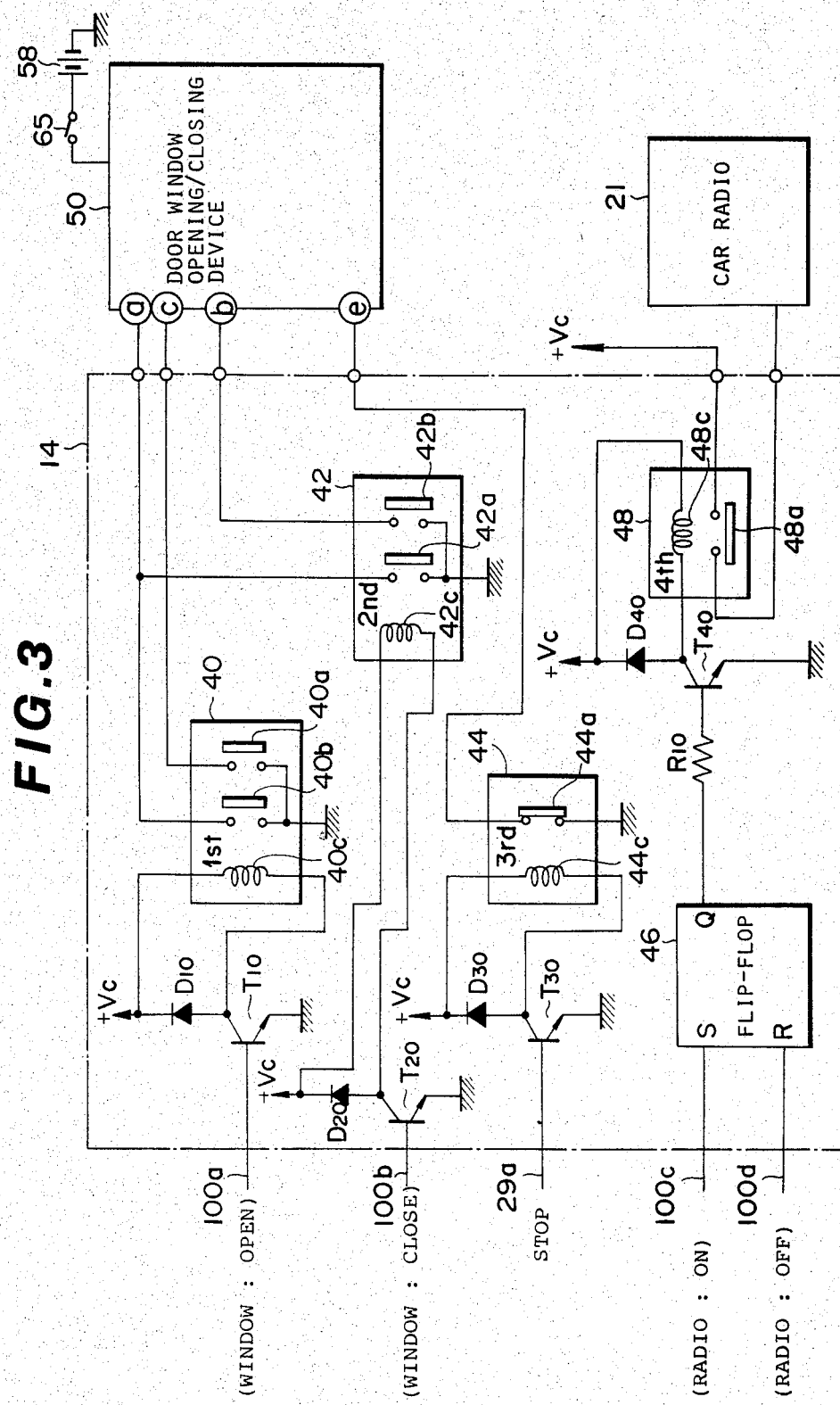
FIG. 3 is a more-detailed circuit diagram of the actuator for a door window opening/closing device and a car radio, which is shown in FIG. 2 above.

FIG. 3 shows an actual circuit configuration of the actuator 14 for use with the first embodiment shown in FIG. 2, to which the signal lines 100a to 100d from the speech recognizer 100 and the signal line 29a from the second timer unit 29 are connected, respectively. The signal line 100a through which a recignition command signal to open the door window is connected to the base of a transistor $T_{10}$. When the signal line 100a becomes a H-level, the transistor $T_{10}$ is turned on to energize the first relay coil 40c of the first relay 40, so that the first relay contacts 40a and 40b are both closed. If these first relay contacts 40a and 40b are closed, since the terminals a and c in the door window opening/closing 50 are grounded, a motor in the door window device 50 is rotated in the direction to lower the window glass, as explained in more detail later with reference to FIG. 4. In the same way, with respect to the signal line 100b through which a recognition command signal to close the door window is outputted, since a transistor $T_{20}$ and a second relay 42 are provided, when a recognition command signal to close the door window is outputted from the speech recognizer 100, the transistor $T_{20}$ is turned on to energize the second coil 42c of the second relay 42, so that the second relay contacts 42a and 42b are both closed. If these second relay contacts 42a and 42b are closed, since the terminals a and b in the door window device 50 are grounded, the motor in the door window device 50 is rotated in the direction to lift the window glass, as explained in more detail later with reference to FIG. 4. Further, since the signal line 29a through which a stop command signal is outputted from the second timer unit 29 is connected to the base of a transistor $T_{30}$ and a third relay 44 is connected to the collector, when the signal line 29a changes to a L-level and therefore a stop command signal is outputted, the transistor $T_{30}$ is off to deenergize the third coil 44c of the third relay 44, so that the normally-closed third relay contacts 44a is opened. As a result, the motor provided in the door window device 50 is stopped from rotating because the power supply (+Vc) is cut off, as explained later with reference to FIG. 4.

On the other hand, with respect to the actuator 14 for the car radio 21, the signal line 100c through which a recognized command signal to turn on the power supply is given is connected to the set terminal S of a flip-flop 46 and the signal line 100d through which a recognized command signal to turn off the power supply is given is connected to the reset terminal R of the flip-flop 46. The output signal Q of this flip-flop 46 is connected to the base of a transistor $T_{40}$ via a resistor $R_{10}$ and a fourth coil 48c of a fourth relay 48 is connected to the collector of the transistor $T_{40}$. In response to a set output signal from the flip-flop 46, the transistor $T_{40}$ is turned on to close the fourth relay contact 48a of a fourth relay 48, so that a supply voltage +Vc is supplied to the car radio 21 via the fourth relay contact 48a. Further, when the flip-flop 46 is reset in response to a recognized command signal applied through the signal line 100d, the transistor $T_{40}$ is turned off to deenergize the fourth coil 48c of the fourth relay 48, so that the relay contact 48a is opened and the power supply to the car radio 21 is cut off.

Figure 4:
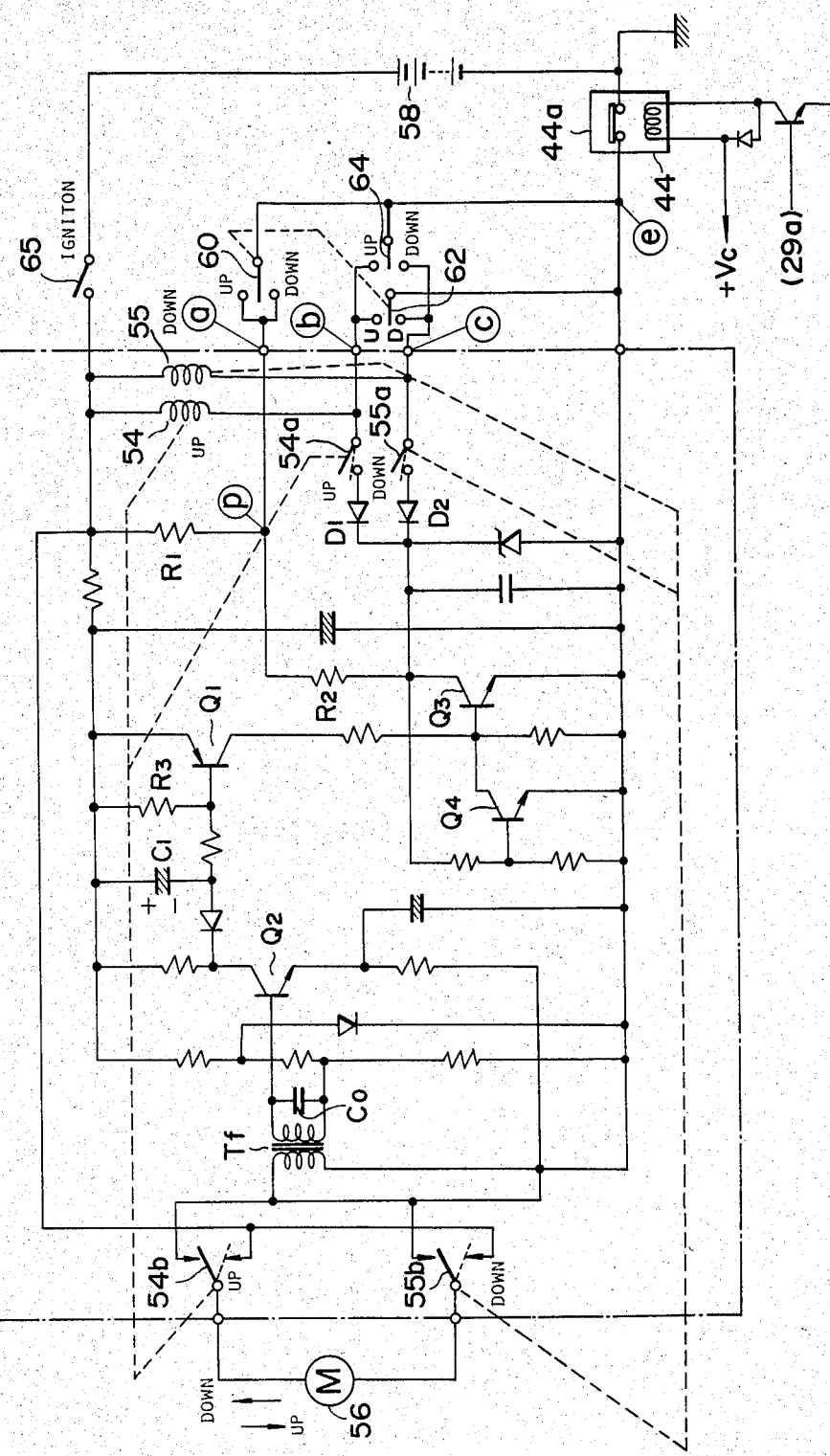
FIG. 4 is a more-detailed circuit diagram of a doow window opening/closing device shown in FIG. 3 above.

FIG. 4 shows an embodiment of an actual circuit configuration of the door window opening/closing device 50 shown in FIG. 3. When a pair of ganged two-way one-touch switches 60 and 62 are set to up-position U or down-position D, a circuit made up of relays 54 and 55, transistors $Q_1$ to $Q_4$ and a transformer $T_f$ operates so as to drive the window motor 56 in the direction to move the window glass upward or downward corresponding to the set positions of the switches 60 and 62. Further, the connection terminals a, b, c, and e of the actuator 14 shown in FIG. 4 correspond to the respective points a, b, c, and e of device 50 shown in FIG. 5. Further, the third relay 44 deenergized by the stop signal to open the third relay contact 44a is connected to the command ground lined for a battery 58.

Now, follows a description of operations of the actuator 14 shown in FIG. 3 and the door window opening/closing device 50 shown in FIG. 4.

To facilitate understanding the operations, the door window opening/closing device 50 of FIG. 4 will be explained first when operated manually.

In FIG. 4, the door window device 50 is provided with an up relay 54 energized when the one-touch switch 62 is closed manually at the up-side position and a down relay 55 energized when the one-touch switch 62 is closed manually at the down-side position. The relays 54 and 55 include normally-open contacts 54a (up) and 55a (down) and change-over contacts 54b (up) and 55b (down) for switching the direction of current passed through the motor 56. Therefore, when the one-touch switches 60 and 62 are closed on the up side, the up relay 54 is energized to set the up contact 54b to the position as shown the broken line, so that current flows from the battery 58, up contact 54b, motor 56, to ground in order to rotate the motor 56 in the direction to lift the window glass.

Also, when the one-touch switches 60 and 62 are closed on the down side, the down relay 55 is energized to set the down contact 55b to the position as shown by the broken line, so that current flows from the battery 58, down contact 55b, motor 56, to ground in order to rotate the motor 56 in the reverse direction to lower the window glass.

The section including the transformer $T_f$ and transistors $Q_1$ to $Q_4$ serves to hold the relay 54 or 55 after the motor 56 is started by depressing the one-touch switches 60 and 62; that is, after the relay 54 or 55 has been once energized. Therefore, even after the one-touch switches 60 and 62 have been returned to its neutral position automatically, the motor 56 is kept rotated in either direction.

That is to say, when the one-touch switches 60 and 62 are closed on the up side U, current is passed through the up relay 54 to energize it, so that the up contact 54a is closed and also the up contact 54b is set to the position as shown by the broken line. Therefore, the motor 56 begins to rotate in the direction to lift the window glass. On the other hand, when the one-touch switch 60 is closed on the up side, since the junction point p between resistors $R_1$ and $R_2$ drops to zero in voltage level, the transistor $Q_4$ which is otherwise on is turned off.

When the motor 56 begins to rotate, a pulsative voltage signal is developed between the brushes of the motor due to a change in armature resistance. This voltage variation is applied to the primary side of the transformer $T_f$ and boosted up on the secondary side thereof to turn on the transistor $Q_2$ after smoothed by a capacitor Co only while the motor 56 is rotating.

When the transistor $Q_2$ is turned on, the condenser $C_1$ is charged up in the polarity as shown. When the condenser $C_1$ is stopped from charging up, a discharge current flows from the emitter to the base of the transistor $Q_1$ to turn on the transistor $Q_1$, so that a base current is supplied to the transistor $Q_3$ to turn on it. When the transistor $Q_3$ is turned on, a circuit consisting of the up relay contact 54a, diode $D_1$ and transistor $Q_3$ is formed in parallel with the one-touch switch 62 closed on the up side. Therefore, even if the one-touch switches 60, 62 are returned to the neutral position, the up relay 54 is kept energized, so that the motor 56 is kept rotating.

When the window glass comes near the fully-closed position, the speed of the motor 56 drops, since the voltage variation generated between the brushes of the motor becomes little, so that the transistor $Q_2$ is turned off. Then, the charged condenser $C_1$ begins to discharge via the resistor $R_3$. When the discharge is completed, the transistors $Q_1$ and $Q_3$ are both turned off, respectively, the up relay 54 is deenergized, to stop the rotation of the motor 56.

Further, if the rotating motor 56 is required to stop, the user must depress the one-touch switches 60, 62 momentarily to the down side D.

That is to say, when the one-touch switches 60, 62 are closed to the down side D momentarily while the motor 56 is rotating due to the up relay 54 energized when the transistor $Q_3$ is on, since the down realy 55 is energized to set the down contact 55b to the position as shown by the broken line, the motor 56 stops rotating. If the time interval during which the one-touch switches 60, 62 are closed to the down side D is long, the motor 56 once stopped begins to rotate reversely in the direction to close the window glass.

Further, in the embodiment shown in FIG. 4, a switch 64 is the one for rotating the motor 56 in a predetermined direction only while this switch is kept closed to the up side or the down side, and an ignition switch 65 is provided in the power line from the battery 58.

Now, returning to FIG. 3, when a H-voltage level command signal to open the door window develops in the signal line 100a, since the transistor $T_{10}$ is turned on to energize the first coil 40c, the contacts 40a and 40b are both closed to connect the terminals a and c to ground. These connections are the same as when the one-touch switches 60 and 62 are set to the downside position manually to rotate the motor 56 in the direction to open the door window.

Similarly, when a H-voltage level command signal to close the door window develops in the signal line 100b, since the transistor $T_{20}$ is turned on to energize the second coil 42c, the contacts 42a and 42c are both closed to connect the terminals a and b to ground. These connections are the same as when the one touch switches 60 and 62 are set to the up-side position manually to rotate the motor 56 in the direction to close the door window.

Further, when a L-voltage command signal to stop the door window from moving develops in the signal line 29a, since the transistor $T_{30}$ is turned off to deenergize the third coil 44c, the normally-closed contact 44a is opened to cut off the supply voltage between e and ground in FIG. 4, so that the power supply to the motor 56 is disconnected to stop the motor from rotating.

Further, in the embodiments described above, the power-operated door window and car radio are sampled as spoken-instruction controlled devices, however, without being limited to these, it is possible to apply this invention to other vehicle devices such as fender mirrors, car air-conditioner, etc. which can be actuated in response to recognized spoken instructions.

Figure 5:
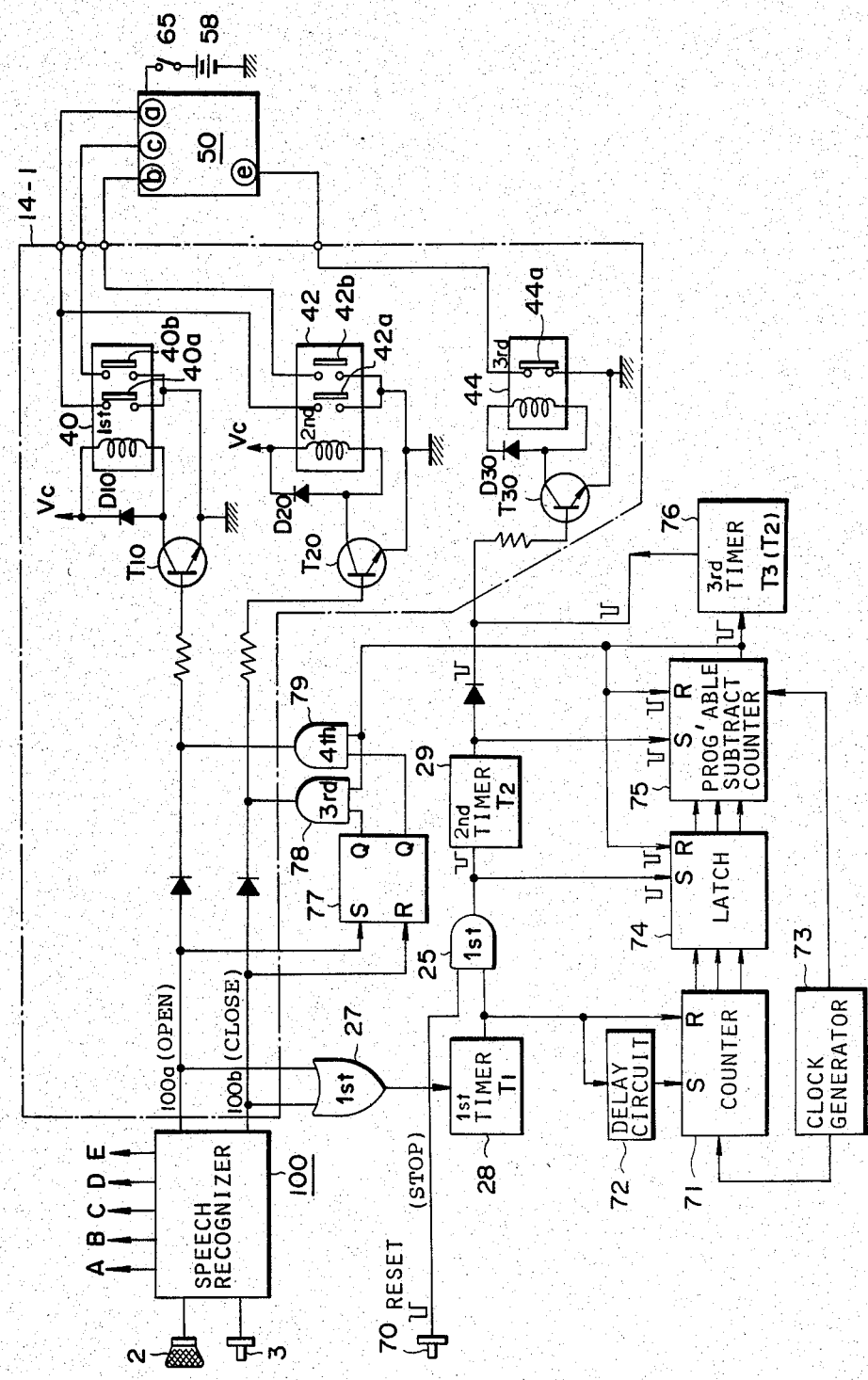
FIG. 5 is a schematic block diagram of a second embodiment of the spoken-instruction controlled system for an automotive vehicle according to the present invention, by which a door window opening/closing device is operated in response to spoken instructions.

FIG. 5 shows a second embodiment according to the present invention, by which a door window is actuated in response to spoken instructions. In this embodiment, when a reset switch is depressed to stop a moving device, the device is first stopped from moving and next returned automatically to its original position at which the moving device is located before the reset switch is depressed. This second embodiment is effective when used with a vehicle device in which time interval during which the device actuator has been operated is important, for instance, such as a door window opening/closing device, fender mirror adjusting device, etc.

In the same way as in the first embodiment shown in FIG. 2, there are provided a microphone 2, a recognition switch 3, and a speech recognizer 100. However, in addition to the recognition switch 3, a reset switch 70 is provided.

When a spoken instruction "Open window" is recognized by the speech recognizer 100, a command signal to open the door window is applied to an actuator 14-1 via the signal line 100a; when "Close window" is recognized, another command signal to close the door window is applied to the actuator 14-1 via the signal line 100b.

The signal line 100a from the speech recognizer 100 is connected to the base of the transistor $T_{10}$. A first relay 40 is connected to the collector of this transistor $T_{10}$. When this transistor $T_{10}$ is turned on, the first relay 40 is energized to close relay contacts 40a and 40b to connect the terminals a and c of a door window opening/closing device 50 to ground, so as to rotate the door window motor in the direction to lower the window as described already. Also, the signal line 100b is connected to the base of a transistor $T_{20}$. A second relay 42 is connected to the collector of the transistor $T_{20}$. When the transistor $T_{20}$ is turned on, the second relay 42 is energized to close relay contacts 42a and 42b to connect the terminals a and b of the door window device 50 to ground, so as to rotate the door window motor in the direction to lift the window as described already. Further, a third relay 44 for stopping the moving door window motor is provided. The third relay 44 is deenergized in rsponse to a stop command signal generated when the reset switch 70 is depressed (explained in more detail later), so that the common ground line of the poor window device 50 is opened to stop the moving window motor as described already.

Now, follows a description of a circuit for returning the moving door window to its original position, that is, by the distance moved in response to an erroneous spoken instruction, after the door window has been stopped by depressing the reset switch 70.

In FIG. 5, there are provided a first OR gate 27 to which the signal lines 100a and 100b are connected, respectively, a first timer unit 28 for outputting a H-level output signal for a predetermined time period $T_1$ (2 to 3 seconds) in response to the H-level output signal from the first OR gate 27, a first AND gate 25 the output of which changes from a H-level to a L-level when the reset switch 70 is depressed during the predetermined time period $T_1$ while the first timer unit 28 is outputting a H-level output, and a second timer unit 29 activated when the AND gate 25 changes to a L-level and outputting a L-level output signal as a stop command signal for a predetermined time period $T_2$ sufficient to stop the door window completely. Further, as means for measuring a time interval from when the window begins moving to when the window stops moving, there is provided a counter 71 which is reset when the output of the first timer unit 28 changes to a H-level and set when the delayed output signal from a delay circuit 72 is given. The delay time of the delay circuit 72 is in unit of microseconds. To the counter 71, a clock pulse having a H-level pulse width of about 50 miliseconds is applied from a clock generator 73. Therefore, the counter 71 starts counting the clock pulses from when the speech recognizer 100 outputs a recognition command signal, through either of the signal line 100a or 100b, to open or close the window glass. The output of the counter 71 is applied to the latch circuit 74, and this latch circuit 74 latches the counted result in the counter 71 at the timing when the output signal of the first AND gate 25 drops to a L-level in response to the depression of the reset switch 70. The output of the latch circuit 74 is given to a programmable subtraction counter 75. This programmable subtraction counter 75 is activated (set) when the second timer unit 29 for outputting a door window stop command signal changes from a H-level to a L-level (at $t_2$ in FIG. 6) for loading the counted value latched in the latch circuit 74, and outputs a H-level output signal from when the second timer unit 29 stops outputting a stop command signal changing from a L-level to a H-level (at $t_3$ in FIG. 6) to when the counted value loaded from the latch circuit 74 is subtracted by the clock pulse from the clock generator 73 and therefore the counted value in the programmable subtract counter 75 becomes zero (at $t_4$ in FIG. 6). The reference numeral 76 denotes a third timer unit activated when the output of the programmable subtract counter 75 charges from a H-level to a L-level because of the end of subtract counting and outputting a L-level output signal to stop the door window within a predetermined time period $T_3$ (almost the same as $T_2$). Further, the latch circuit 74 and the programmable subtract counter 75 are both reset when the output signal of the programmable subtract counter 75 changes to a L-level due to the end of subtract counting.

On the other hand, each of the signal lines 100a and 100b from the speech recognizer 100 is connected to the set or the reset terminal of a flip-flop 77, respectively. This flip-flop 77 is set by the recognition command signal corresponding to door-window opening into $Q=H$ or $\bar{Q}=L$ and reset by the recognition command signal corresponding to door-window closing into $Q=L$ or $\bar{Q}=H$. The output Q of the flip-flop 77 is connected to the third AND gate 78; the output $\bar{Q}$ is connected to the fourth AND gate 79. When the flip-flop 77 is set in response to the recognition signal through the signal line 100a, the third AND gate 78 is enabled so as to apply a H-level output signal from the programmable subtract counter 75 to the signal line 100b; on the other hand, when the flip-flop 77 is reset in response to the recognition signal through the signal line 100b, the fourth AND gate 79 is enabled so as to apply a H-level output signal from the programmable subtract counter 75 to the signal line 100a.

Figure 6:
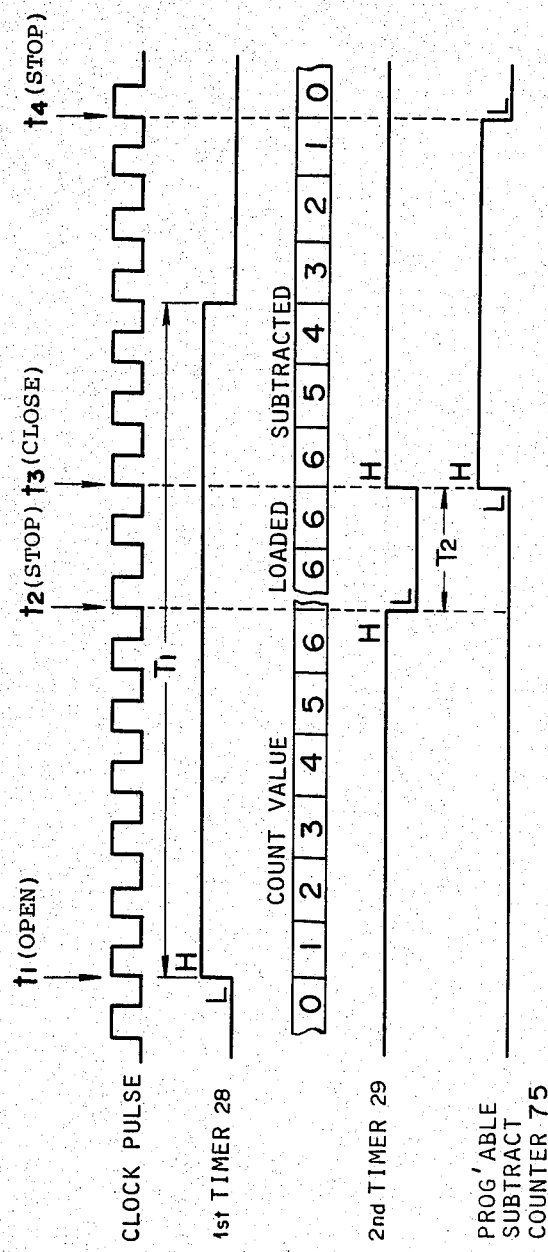
FIG. 6 is a timing chart showing the waveforms at each essential position in the second embodiment shown in FIG. 5 above.

Next, the operation of the second embodiment of FIG. 5 will be described with reference to a timing chart of FIG. 6.

For instance, when the recognition switch 3 is turned on and a spoken instruction corresponding to a car radio is uttered, the assumption is made that the spoken instruction is recognized erroneously in the speech recognizer 100 due to some reasons such as unclear spoken instruction or intense noise mixture and, as a result, a recognition command signal develops through the signal line 100a for opening the door window at the time $t_1$. In response to the speech recognition command signal through the signal line 100a, the transistor $T_{10}$ is turned on to energize the relay 40. When the relay contacts 40a and 40b are closed, the terminals a and c of the door window device 50 is grounded, so that the window glass is lowered as described in FIG. 4.

On the other hand, in response to the speech recognition command signal through the signal line 100a, the first OR gate 27 outputs a H-level output signal to activate the first timer unit 28 for a predetermined time period $T_1$ so as to output a H-level output signal. Therefore, in response to this H-level output of the first timer unit 28, the counter 71 is first reset, but soon set in response to a delayed output signal from the delay circuit 72; that is the counter 71 is activated to start counting the clock pulses from the clock generator 73.

Next, in order to stop the door window in erroneous operation, if the reset switch 70 is turned on at time $t_2$, in response to a L-level output signal from the reset switch 70 the output of the first AND gate 25 changes to a L-level to set the latch circuit 64, so that the counted value, for instance, "6" of the counter 71 is latched at time $t_2$. Simultaneously, when the output of the first AND gate 25 drops to a L-level, the second timer unit 29 is activated to output a L-level stop command signal for a predetermined time period $T_2$. Therefore, the transistor $T_{30}$ is turned off for a predetermined time period to open the relay contact 44a of the third relay 44. When the relay contact 44a is opened, the common ground line of the door window device 50 is opened to stop the downwardly-moving door window.

When the second timer unit 29 outputting a L-level door-window stop command signal returns to the original state in which a H-level signal is outputted, at time $t_3$, after a predetermined time period $T_2$, the programmable subtract counter 75 starts loading the counted value "6" of the counter 71 latched at time $t_2$ in the latch circuit 74 as a preset value, and outputs a H-level output signal until this counted value becomes zero being subtracted by the clock pulses from the clock generator 73.

On the other hand, since the flip-flop 77 is set by the recognition command signal through the signal line 100a, so that one input terminal of the third AND gate 78 is at a H-level. Therefore, the H-level output signal from the programmable subtract counter 75 is supplied to the base of the transistor $T_{20}$ via the third AND gate 78. In other words, while the programmable subtract counter 75 is outputting a H-level output signal (between $t_3$ and $t_4$), that is, while the power window has been operated (between $t_1$ and $t_2$), the transistor $T_{20}$ is on, so that the second relay 42 is energized to close the relay contacts 42a and 42b, that is, to lift the door window by actuating the door window device 50. As described above, when the subtract result in the programmable subtract counter 75 becomes zero at time $t_4$, the output of the programmable subtract counter 75 drops from a H-level to a L-level to turn off the transistor $T_{20}$ and activate the third timer unit 76 for a predetermined time period $T_3$ sufficient to stop the door window completely. In response to the L-level output of the third timer unit 76, the transistor $T_{30}$ is turned off to open the relay contact 44a of the third relay 44. Therefore, since the common ground line of the door window device 50 is opened, the power window is stopped at the original position.

In the second embodiment of FIG. 5 as described above, in case the door window is erroneously operated due to erroneous recognition of a spoken instruction, the operation of the door window can be stopped when the reset switch 70 is turned on within a predetermined time period $T_1$. Once stopped from moving, the door window is moved automatically in the reverse direction by the time interval during which the power window has been already moved. Therefore, even when an erroneous recognition of a spoken instruction occurs, it is possible to return the door window to the original position automatically only by depressing the reset switch 70. Since there is no need of utterance of any other spoken instruction in such case, it is possible to stop and return the operation of the door window easily when an erroneous recognition unfortunately occurs.

Further, in the embodiments described above, the door window is sampled as vehicle devices, without being limited to this, it is possible to apply the spoken-instruction controlled system according to the present invention to other appropriate vehicle devices such as an air conditioner or fender mirrors.

Figure 7:
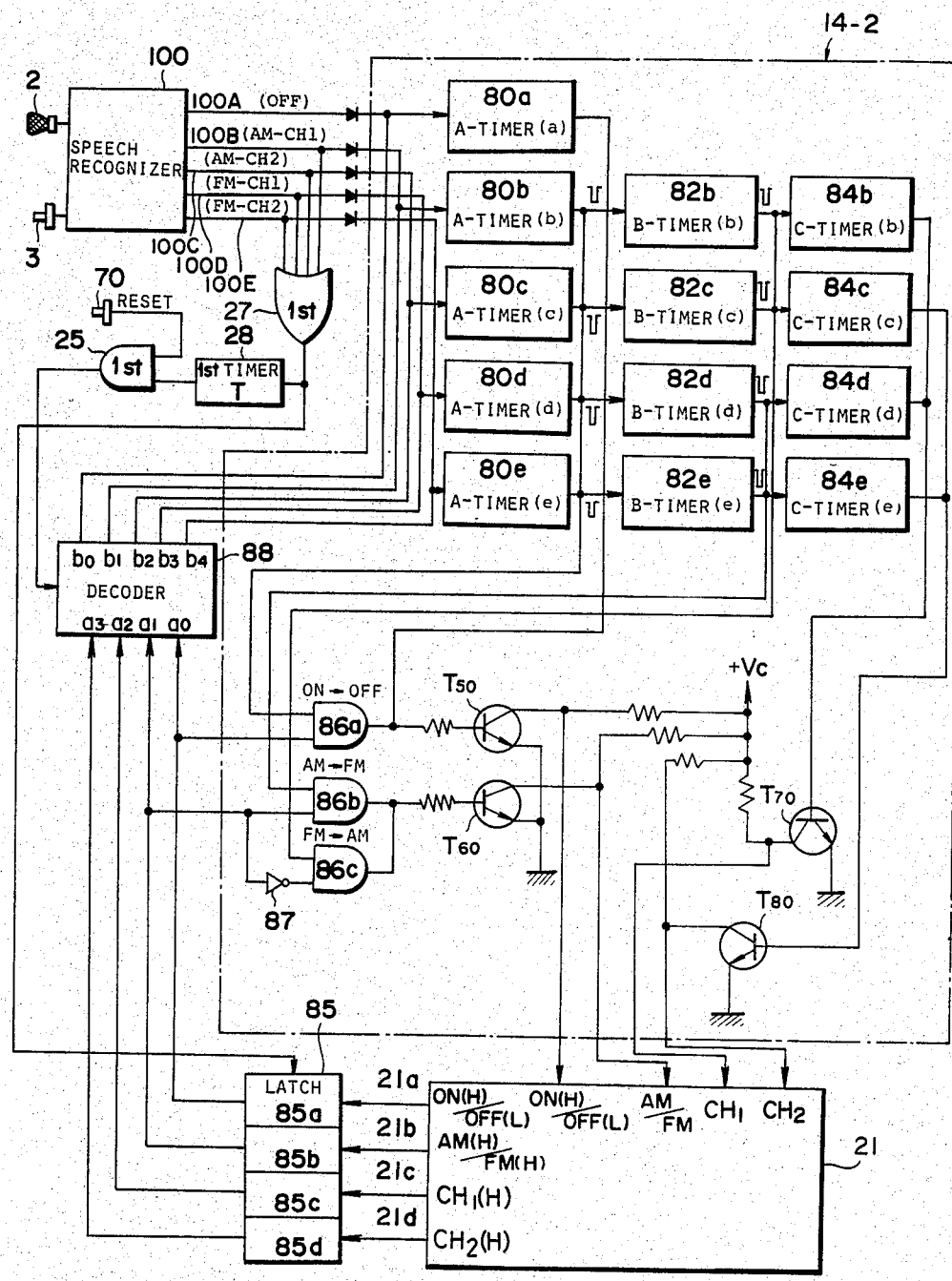
FIG. 7 is a schematic block diagram of a third embodiment of the spoken-instruction controlled system for an automotive vehicle according to the present invention, by which an electronic tuner-type car radio is actuated in response to spoken instructions.

FIG. 7 shows a third embodiment according to the present invention, by which an electronic tuner-type car radio is actuated in response to spoken instructions. In this embodiment, when a reset switch is depressed to stop the operation of a car radio, the car radio is first stopped from operating and next returned to the original operating state in which the car radio is operated before the reset switch is depressed. Further, in this embodiment, turning-on or -off of car-radio power supply, switching of AM to FM or vice versa, and section of channels can be instructed in accordance with spoken instructions.

The third embodiment is effective when used with a vehicle device in which on-off conditions under which the vehicle device actuator has been operated are important, for instance, such as a car-radio, air-conditioning system, etc.

In the same way as in the second embodiment shown in FIG. 5, there are provided a microphone 2, a recognition switch 3, a speech recognizer 100, a reset switch 70, a first AND gate 25, a first OR gate 27, a first timer 28, etc.

When a spoken instruction "Radio OFF" is recognized by the speech recognizer 100, a command signal to turn off a car radio 21 is applied to an actuator 14-2 via the signal line 100A; when "AM channel one" is recognized, another command signal to select a first channel in AM is applied to the actuator 14-2 via the signal line 100B; when "AM channel two" is recognized, another command signal to select a second channel in AM is applied to the actuator 14-2 via the signal line 100C; when "FM channel one" is recognized, another command signal to select a first channel in FM is applied to the actuator 14-2 via the signal line 100D; when "FM channel two" is recognized, another command signal to select a second channel in FM is applied to the actuator 14-2 via the signal line 100E.

Each of signal lines 100A to 100E from the speech recognizer 100 is connected to each of A-timer units 80a to 80e, respectively, provided in a car-radio actuator 14-2. Each A-timer unit generates a H-level output signal for a predetermined time period when the command signal through the signal line rises from a L-level to a H-level. Each of the outputs of the A-timer units 80b to 80e is given to each of B-timer units 82b to 82e which output a H-level output signal for a predetermined time period when the A-timer units 80b to 80e change from a H-level to a L-level. Additionally, there are provided C-timer units 84b to 84e which are activated for a predetermined time period by the output signals of the B-timer units 82b to 82e to output a H-level output signal.

The reference numeral 21 denotes a car radio provided with an electronic tuner actuated by spoken instructions, in which the turning-on or -off of the power supply, the switching of AM to FM or vice versa, and the selection of channel 1 or 2 can be instructed, respectively, by a L-level signal obtained when each of the transistors $T_{50}$ to $T_{80}$ is tuned on or off. Also, the car radio 21 applies output signals indicative of car-radio operation states to a latch memory 85 through signal lines 21a to 21d.

In more detail, when a H-level signal is applied to the ON/OFF terminal of the car radio 21, the car radio is turned on; when a L-level signal is applied to the ON/OFF terminal, the car radio is turned off; when a L-level signal is applied to the AM/FM terminal of the car radio 21, AM is switched to FM or vice versa one by one in response to the L-level signal; when a L-level signal is applied to the CH1 terminal of the car radio 21, Channel one is selected; when a L-level signal is applied to the CH2 terminal, Channel two is selected.

Furthermore, when the power supply is turned on, a H-level signal is outputted from the signal line 21a; when the power supply is turned off, a L-level signal is outputted from the signal line 21a; when AM is selected, a H-level signal is outputted from the signal line 21b; when FM is selected, a L-level signal is outputted from the signal line 21b; when Channel one is selected, a H-level signal is outputted from the signal line 21c; when channel two is selected, a H-level signal is outputted from the signal line 21d.

The latch memory 85 has memory sections 85a to 85d corresponding to the signal lines 21a to 21d to latch the signals indicative of operation states of the car radio 21 in response to a H-level output signal from the first OR gate 27 to which the signal lines 100A to 100E are connected from the speech recognizer 100. That is to say, the operation state of the car radio 21 is latched in the latch memory 85 at a timing of when a recognition command signal is generated from the speech recognizer 100 through one of the signal lines 100A to 100E.

Next, there is described the control section provided for the car-radio actuator 14-2 including a transistor $T_{50}$ for turning on or off the power supply, a transistor $T_{60}$ for switching AM to FM or vice versa and a transistor $T_{70}$ for selecting the channel 1 and a transistor $T_{80}$ for selecting the channel 2.

First, the transistor $T_{50}$ for turning on or off the power supply is described. Each output signal of the A-timer units 80b to 80e and the output signal from the memory section 85a in the latch memory 85 are inputted to the AND gate 86a. Therefore, when a L-level signal indicative of power off is latched in the memory section 85a of the latch memory 85 and further the speech recognizer 100 is outputting a recognition command signal through one of the signal lines 100B to 100E and thus one of the A-timer units 80b to 80e outputs a H-level output signal for a predetermined time period in response to this recognition signal, the output of the AND gate 86a becomes a L-level to turn off the transistor $T_{50}$, so that the power supply is supplied to the car radio 18. Further, since the output of the A-timer unit 80a is directly connected to the base of the transistor $T_{50}$, when a recognition command signal for a spoken instruction "Radio off" is developed at the signal line 100A, irrespective of car-radio operating state, the transistor $T_{50}$ is turned on to turn off the power supply.

Secondly, the transistor $T_{60}$ for switching AM to FM or vice versa is described. The output signal of the memory section 85b for latching the switching state of AM and FM and the output signals of the B-timer units 82d and 82e activated when the A-timer unit 80d or 80e changes from a H-level to a L-level are inputted to the AND gate 86b. Therefore, when a spoken instruction "FM channel one" or "FM channel two" is recognized, the A-timer unit 80d or 80e is activated; the B-timer unit 82d or 82e is activated after a predetermined time period in response to a L-level signal from the A-timer unit; a H-level signal is applied to one input terminal of the AND gate 86b. On the other hand, when the car radio is receiving AM, since the memory section 85b of the latch memory 85 is at a H-level, the AND gate 86b outputs a H-level signal to turn on the transistor $T_{60}$, so that the AM/FM terminal of the car radio 21 changes to a L-level to switch AM to FM.

On the other hand, the inverted output signal of the memory section 85b for latching the switching state of AM and FM and the output signals of the B-timer units 82b and 82c activated when the A-timer unit 80b or 80c changes from a H-level to a L-level are inputted to the AND gate 86c. Therefore, when a spoken instruction "AM channel one" or "AM channel two" is recognized, the A-timer unit 80b or 80c is activated; the B-timer unit 82b or 82c is activated after a predetermined time period in response to a L-level signal from the A-timer unit; a H-level signal is applied to one input terminal of the AND gate 86c. On the other hand, when the car radio is receiving FM, since the memory section 85b of the latch memory 85 is at a L-level but its level is inverted into a H-level via an inverter 87, the AND gate 86c outputs a H-level signal to turn on the transistor $T_{60}$, so that the AM/FM terminal of the car radio 21 changes to a L-level to switch FM to AM.

Further, to the base of the transistor $T_{70}$ for selecting channel one, the outputs of the C-timer units 84b and 84b corresponding to the recognition command signals of spoken instructions for selecting channel one in AM and FM are connected. Also, to the base of the transistor $T_{80}$ for selecting channel two, the outputs of the C-timer units 84c and 84e corresponding to the recognition command signals of spoken instructions for selecting channel two in AM and FM are connected.

Therefore, when a spoken instruction "AM channel one" or "FM channel one" is uttered, the A-timer unit 80b or 80d is activated; the B-timer unit 82b or 82d is activated when the A-time-unit changes to a L-level; the C-timer unit 84b or 84d is activated when the B-timer unit changes to a L-level; therefore, after the channel is selected to AM or FM completely, the transistor $T_{70}$ is turned on to apply a L-level signal to the CH1 terminal of the car radio 21, so that channel one can be selected.

Similarly, when a spoken instruction "AM channel two" or "FM channel two" is uttered, the A-timer unit 80c or 80e is activated; the B-timer unit 82c or 82e is activated when the A-timer unit changes to a L-level; the C-timer unit 84c or 84e is activated when the B-timer unit changes to a L-level; therefore, after the channel is selected to AM or FM completely, the transistor $T_{80}$ is turned on to apply a L-level signal to the CH2 terminal of the car-radio 21, so that channel two can be selected.

Next, there is described the circuit configuration for stopping the car radio 21 once operated erroneously in response to a spoken instruction and for automatically returning the erroneously-operated car radio to its original operating condition after the car radio 21 has been stopped.

As this stop-return means, there is provided a reset switch 70. The reset switch 70 outputs a L-level output signal when off and a H-level signal when on. Further, to the output of the first OR gate 27, there is provided a first timer unit 28 which is activated for generating a H-level output signal for a predetermined time period $T_1$ (about two seconds) when the output of the first OR gate 27 rises from a L-level to a H-level. Each output of this first timer unit 28 and the reset switch 70 is given to the first AND gate 25. Therefore, when the reset switch 70 is turned on within the time period $T_1$, the first AND gate 25 outputs a H-level signal. The output of the first AND gate 25 is given to a decoder 88, and the decoder 88 decodes the output signals from the latch memory 85, which are inputted to the input terminals $a_0$ to $a_3$ in response to the H-level output signal from the first AND gate 25, and outputs binary codes from the output terminals $b_0$ to $b_4$. The Table below lists the relationships between the input and the output of this decoder 88.

TABLE

| Radio | $a_0$ | $a_1$ | $a_2$ | $a_3$ | $b_0$ | $b_1$ | $b_2$ | $b_3$ | $b_4$ |
|---|---|---|---|---|---|---|---|---|---|
| Radio power off | 0 | 0 | 0 | 0 | 1 | 0 | 0 | 0 | 0 |
| AM $CH_1$ selection | 0 | 1 | 1 | 0 | 0 | 1 | 0 | 0 | 0 |
| AM $CH_2$ selection | 0 | 1 | 0 | 1 | 0 | 0 | 1 | 0 | 0 |
| FM $CH_1$ selection | 0 | 0 | 1 | 0 | 0 | 0 | 0 | 1 | 0 |
| FM $CH_2$ selection | 0 | 0 | 0 | 1 | 0 | 0 | 0 | 0 | 1 |

As well understood by Table above, the function of the decoder 88 is to convert the operating state latched in the latch memory 85 into the output code $b_0$ to $b_4$ which is the same as when a spoken instruction of each operating condition is recognized by the speech recognizer 100 before the reset switch 70 is depressed and to output the code to each of the A-timer units 80a to 80e, respectively. When the decoder 88 outputs signals, the car-radio 21 is returned to the original state determined by the output signals $b_0$ to $b_4$ from the decoder 88.

Next, the operation of the embodiment shown in FIG. 7 will be described hereinbelow.

The case is described where, for instance, Channel 1 is selected in AM in response to a spoken instruction "AM channel one". In this case, the car radio 21 is in a state where the power supply is off at the initial condition.

When the recognition switch 3 is turned on and a spoken instruction "AM channel one" is uttered, the speech recognizer 100 recognizes this spoken instruction and outputs a H-level output signal through the signal line 100b. This H-level output signal is given to the latch memory 85 via the first OR gate 27 to latch a L-level signal corresponding to the state where power supply is off in the memory section 85a of the latch memory 85. If the car radio 21 is in a state of FM, a L-level signal indicative of FM state is latched in the memory section 85b. Further, if no channel selection is made (when the car radio is tuned manually without use of the speech recognition system), a L-level signal is latched in the memory sections 85c and 85d. On the other hand, in respone to the H-level output signal from the first OR gate 27, the first timer 28 is activated for a predetermined time period $T_1$ (2 seconds) for outputting a H-level output signal.

The H-level signal outputted through the signal line 100b of the speech recognizer 100 is also given to the A-timer unit 80b to activate it so as to output a H-level output signal for a predetermined time period. Therefore, the H-level output signal from the A-timer unit 80b is applied to one input terminal of the AND gate 86a. At this moment, since a L-level output signal corresponding to power-off is inputted from the memory section 85a of the latch memory 85, the AND gate 86a outputs a L-level output signal to turn off the transistor $T_{50}$, so that the power supply of the car radio 21 is supplied.

The A-timer unit 80b stops operating after a predetermined time period outputting a L-level signal from a H-level signal. The drop to this L-level is detected by the B-timer unit 82b to change its output signal to the AND gate 86c to a H-level and to activate the C-timer 84b for a predetermined time period so as to output a H-level output signal. At this time, since a L-level signal corresponding to FM state latched in the memory section 85b of the latch memory 85 is inverted by the inverter 87 into a H-level and is inputted to the AND gate 86c, when the B-timer unit 82b is outputting a H-level output, the output of the AND gate 86c changes to a H-level to turn on the transistor $T_{60}$, so that the car radio 21 in FM state is switched to AM reception state.

Further, since the H-level output of the C-timer unit 84b turns on the transistor $T_{70}$ to apply a L-level signal to the CH1 terminal, the car radio 21 is selected to Channel 1. As described above, the actuator 14-2 receiving a recognition command signal of a spoken instruction "AM channel one" turns on the power supply of the car radio 21, switches it to the AM state, and selects Channel 1, thus AM channel one broadcasting is received.

Next, in the case where the recognition switch 3 is turned on and a spoken instruction "FM channel one" is uttered in order to switch the "AM channel one" reception state to the FM channel one reception state and, in the midst of utterance, the original "AM channel one" reception state is required to return, the reset switch 70 should be depressed within the predetermined time period $T_1$ (two seconds) determined by the first timer unit 28 activated via the first OR gate 27 by the H-level output signal developed in the signal line 100D. That is to say, when the reset switch 70 is turned on while the first timer unit 28 is outputting a H-level output signal, the output of the first AND gate 25 changes to a H-level to apply a signal to the decoder 88. On the other hand, the reception state of AM channel one broadcasting is latched in the latch memory 85 in response to the H-level output from the first OR gate 27 due to the recognition command signal applied through the signal line 100D. Therefore, as shown in Table, (0110) corresponding to AM-CH$_1$ selection is inputted to the input terminals $a_0$ to $a_3$ of the decoder 88. In response to the H-level output from the first AND gate 25 obtained when the reset switch 70 is depressed, (01000) is outputted from the output terminals $b_0$ to $b_4$. As a result, since this is the same state as where a recognition output is developed in the signal line 100b, the car radio 21 once switched to FM channel one reception state by the operations of the timer units 80b, 82b, and 84b is automatically returned to the original reception state (AM-CH1).

As described above, in the spoken-instruction controlled system for an automotive vehicle according to the present invention, since a vehicle device actuated in response to a spoken instruction can be stopped when the recognition switch is turned on again while the speech recognizer command signal is held for a predetermined time period, if a wrong device is actuated due to an erroneous recognition of a spoken instruction, it is possible to stop the device in erroneous operation easily. Further, once the recognition switch is depressed again, since the succeeding spoken instruction can be recognized automatically for a predetermined time period, it is possible to correct the erroneously-operating device easily.

Furthermore, as described above, in the spoken-instruction controlled system for an automotive vehicle according to the present invention, since the device operation state when the recognition switch is depressed is stored, even if a wrong device is actuated due to an erroneous recognition of a spoken instruction, it is possible to stop the device in erroneous operation easily and further to return the device to the original operating state, thus facilitating the correction of an erroneously-operating vehicle device.

Description has been made hereinabove of the case where the embodiments according to the present invention comprises various discrete elements or sections; however, it is of course possible to embody the present invention with a microcomputer including a central processing unit, a read-only memory, a random-access memory, a clock oscillator, etc. That is to say, all of the functions of the present invention can be implemented via the operations executed in accordance with appropriate software, in place of hardware, together with the various functions of the speech recognizer.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A spoken-instruction controlled system for an automotive vehicle which can operate at least one vehicle device in accordance with a plurality of spoken instructions inputted through a microphone when a recognition switch is kept turned on which comprises:
   (a) a speech recognizer for outputting a plurality of recognition command signals independently whenever one of a plurality of predetermined spoken instructions is recognized to be similar to one of recorded reference spoken instruction pattern data;
   (b) at least one vehicle device actuator connected between said speech recognizer and the vehicle device for actuating the vehicle device in response to the recognition command signals; and
   (c) means for outputting a stop command signal to said vehicle device actuator for a predetermined time period $T_2$ when recognition switch is turned on again within a predetermined time period $T_1$ after said speech recognizer has outputted a recognition command signal to said vehicle device actuator, said stop command signal outputting means being connected to said speech recognizer and the recognition switch.

2. A spoken-instruction controlled system for an automotive vehicle as set forth in claim 1, which further comprises means for enabling said speech recognizer to recognize spoken instructions for a predetermined time period $T_3$ after said stop command signal outputting means has stopped outputting a stop command signal to said vehicle device actuator, said enabling means being connected to said speech recognizer, the recognition switch and said stop command signal outputting means.

3. A spoken-instruction controlled system for an automotive vehicle as set forth in claim 1, which further comprises:
   (a) a reset switch for outputting a reset command signal when turned on, said reset switch being connected to said stop command signal outputting means;
   (b) means for storing the original operating conditions of the vehicle device actuators whenever said reset switch is turned on within a predetermined time period $T_1$ after said speech recognizer has outputted a recognition command signal, said storing means being connected to said stop command signal outputting means; and
   (c) means for returning the present operating conditions of the vehicle device actuator to the original operating conditions a predetermined time period $T_2$ after said reset switch has been turned on.

4. A spoken-instruction controlled system for an automotive vehicle as set forth in claim 1, wherein said stop command signal outputting means comprises:
   (a) a first OR gate connected to said speech recognizer for ORing a plurality of recognition command signals outputted from said speech recognizer in response to a plurality of spoken instructions;
   (b) a first timer unit connected to said OR gate for outputting a signal for a predetermined time period $T_1$ in response to the ORed signal from said OR gate;

(c) a first AND gate one input terminal of which is connected to the recognition switch, the other input terminal of which is connected to said first timer unit for outputting an ANDed signal when the recognition switch is turned on which said first timer unit is outputting a signal; and (d) a second timer unit connected to said first AND gate for outputting a stop command signal to said vehicle device actuator in response to the ANDed signal from said first AND gate for a predetermined time period $T_2$ sufficient to stop the vehicle device completely.

5. A spoken-instruction controlled system for an automotive vehicle as set forth in claim 2, wherein said speech recognizer enabling means comprises:

(a) a second AND gate one input terminal of which is connected to the recognition switch and the other input terminal of which is connected to said stop command signal outputting means for outputting an ANDed signal only when the recognition switch is turned on while said stop command signal outputting means is outputting no stop command signal;

(b) a third timer unit connected to said stop command signal outputting means for outputting a signal for a predetermined time period $T_3$ after said stop command signal outputting means stops outputting a stop command signal; and (c) a second OR gate one input terminal of which is connected to said second AND gate and the other input terminal of which is connected to said third timer unit for outputting an ORed signal to said speech recognizer to enable said recognizer to recognize spoken instructions inputted through the microphone within a predetermined time period $T_3$ after said stop command signal outputting means has stopped outputting a stop command signal to said vehicle device actuator.

6. A spoken-instruction controlled system for an automotive vehicle as set forth in claim 3, wherein said original operating condition storing means comprises:

(a) a clock pulse generator for outputting a clock pulse;

(b) a counter connected to said stop command signal outputting means and said clock pulse generator for counting the number of clock pulse signals beginning from when said speech recognizer outputs a recognition command signal to said vehicle device actuator; and (c) a latch circuit connected to said stop command signal outputting means and said counter for latching a value counted by said counter in response to the reset command signal.

7. A spoken instruction controlled system for an automotive vehicle as set forth in claim 3, wherein said original operating condition returning means comprises:

(a) a clock pulse generator for outputting a clock pulse;

(b) a programmable subtract counter connected to said clock pulse generator, said original operating condition storing means and said stop command signal outputting means for loading the stored value thereinto in response to the reset command signal and subtracting the number of clock pulses from the loaded value and outputting a signal when the subtracted value becomes zero, the outputted signal resetting said programmable subtract counter itself;

(c) a third timer unit connected to said programmable subtract counter for outputting another stop command signal to said vehicle device actuator in response to the signal outputted from said programmable subtract counter;

(d) a flip-flop the set terminal S of which is connected to one output terminal of said speed recognizer for receiving a first command signal and the reset terminal R of which is connected to the other output terminal of said speech recognizer for receiving a second command signal;

(e) a third AND gate one input terminal of which is connected to the output terminal Q of said flip-flop and the other input terminal of which is connected to said programmable subtract counter for outputting an ANDed second command signal to said vehicle device actuator when said flip-flop is set in response to the first command signal and when said programmable subtract counter is outputting a signal; and (f) a fourth AND gate one input terminal of which is connected to the inversion output terminal $\overline{Q}$ of said flip-flop and the other input terminal of which is connected to said programmable subtract counter for outputting an ANDed first command signal to said vehicle device actuator when said flip-flop is reset in response to the second command signal and when said programmable subtract counter is outputting a signal.

8. A spoken-instruction controlled system for an automotive vehicle as set forth in claim 3, wherein said original condition storing means is a latch circuit provided with a plurality of memory sections, said latch circuit being connected to the vehicle device for storing a plurality of device operating conditions therein in response to the recognition command signal from said speech recognizer.

9. A spoken-instruction controlled system for an automotive vehicle as set forth in claim 3, wherein said original operating condition returning means is a decoder connected to said original condition storing means, said speech recognizer and said stop command signal outputting means for decoding a binary code stored in said original condition storing means and outputting another binary code corresponding to the stored binary code to the respective output terminals of said speech recognizer in response to the stop command signal.

10. A spoken-instruction controlled system for an automotive vehicle which can operate at least one vehicle device in accordance with a plurality of spoken instructions inputted through a microphone when a recognition switch is kept turned on which comprises:

(a) a speed recognizer for outputting a plurality of recognition command signals independently whenever one of a plurality of predetermined spoken instructions is recognized to be similar to one of recorded reference spoken instruction pattern data;

(b) at least one vehicle device actuator connected between said speech recognizer and the vehicle device for actuating the vehicle device in response to the recognition command signals;

(c) a first OR gate connected to said speech recognizer for ORing a plurality of recognition command signals outputted from said speech recognizer in response to a plurality of spoken instructions;

(d) a first timer unit connected to said first OR gate for outputting a signal for a predetermined time period $T_1$ in response to the ORed signal from said first OR gate;

(e) a first AND gate one input terminal of which is connected to the recognition switch, the other input terminal of which is connected to said first timer unit for outputting an ANDed signal when the recognition switch is turned on while said first timer unit is outputting a signal;

(f) a second timer unit connected to said first AND gate for outputting a stop command signal to said vehicle device actuator in response to the ANDed signal from said first AND gate for a predetermined time period $T_2$ sufficient to stop the vehicle device completely;

(g) a second AND gate one input terminal of which is connected to the recognition switch and the other input terminal of which is connected to said first timer unit for outputting an ANDed signal only when the recognition switch is turned on while said first timer unit is outputting no signal;

(h) a third timer unit connected to said second timer unit for outputting a signal for a predetermined time period $T_3$ after said second timer unit stops outputting a stop command signal; and (i) a second OR gate one input terminal of which is connected to said second AND gate and the other input terminal of which is connected to said third timer unit for outputting an ORed signal to said speech recognizer to enable said recognizer to recognize spoken instructions inputted through the microphone within a predetermined time period $T_3$ after said stop command signal outputting means has stopped outputting a stop command signal to said vehicle device actuator, whereby an erroneously-operating device can be stopped and the succeeding correct spoken instruction can be recognized, when the recognition switch is once depressed.

11. A spoken-instruction controlled system for an automotive vehicle which can operate at least one vehicle device in accordance with a plurality of spoken instructions inputted through a microphone when a recognition switch is kept turned on which comprises:

(a) a speed recognizer for outputting a plurality of recognition command signals independently whenever one of a plurality of predetermined spoken instructions is recognized to be similar to one of recorded reference spoken instruction pattern data;

(b) at least one vehicle device actuator connected between said speech recognizer and the vehicle device for actuating the vehicle device in response to the recognition command signals;

(c) a reset switch for outputting a reset command signal when turned on;

(d) a first OR gate connected to said speech recognizer for ORing a plurality of recognition command signals outputted from said speech recognizer in response to a plurality of spoken instructions;

(e) a first timer unit connected to said OR gate for outputting a signal for a predetermined time period $T_1$ in response to the ORed signal from said OR gate;

(f) a first AND gate one input terminal of which is connected to the reset switch, the other input terminal of which is connected to said first timer unit for outputting an ANDed signal in response to the reset command signal while said first timer unit is outputting a signal; and (g) a second timer unit connected to said first AND gate for outputting a stop command signal to said vehicle device actuator in response to the ANDed signal from said first AND gate for a predetermined time period $T_2$ sufficient to stop the vehicle device completely.

(h) a clock pulse generator for outputting a clock pulse;

(i) a counter connected to said first timer unit and said clock pulse generator for counting the number of clock pulse signals beginning from when said first timer unit outputs a signal;

(j) a latch circuit connected to said first AND gate and said counter for latching a value counted by said counter in response to the ANDed signal from said first AND gate;

(k) a programmable subtract counter connected to said latch circuit, said clock pulse generator, and said second timer unit for loading the stored value thereinto in response to the stop command signal from said second timer unit and subtracting the number of clock pulses from the loaded value and outputting a signal when the subtracted value becomes zero, the outputted signal resetting said programmable subtract counter itself and said latch circuit;

(l) a third timer unit connected to said programmable subtract counter for outputting another stop command signal to said vehicle device actuator in response to the signal outputted from said programmable subtract counter;

(m) a flip-flop the set terminal S of which is connected to one output terminal of said speech recognizer for receiving a first command signal and the reset terminal R of which is connected to the other output terminal of said speech recognizer for receiving a second command signal;

(n) a third AND gate one input terminal of which is connected to the output terminal Q of said flip-flop and the other input terminal of which is connected to said programmable subtract counter for ouputting an ANDed second command signal to said vehicle device actuator when said flip-flop is set in response to the first command signal and when said programmable subtract counter is outputting a signal; and (o) a fourth AND gate one input terminal of which is connected to the inversion output terminal $\overline{Q}$ of said flip-flop and the other input terminal of which is connected to said programmable subtract counter for outputting an ANDed first command signal to said vehicle device actuator when said flip-flop is reset in response to the second command signal and when said programmable subtract counter is outputting a signal, whereby an erroneouly-operating device can be stopped and operted reversely to its original position on the basis of counted time interval.

12. A spoken-instruction controlled system for an automotive vehicle which can operate at least one vehicle device in accordance with a plurality of spoken instructions inputted through a microphone when a recognition switch is kept turned on which comprises:

(a) a speed recognizer for outputting a plurality of recognition command signals independently whenever one of a plurality of predetermined spoken instructions is recognized to be similar to one of recorded reference spoken instruction pattern data;

(b) at least one vehicle device actuator connected between said speech recognizer and the vehicle device for actuating the vehicle device in response to the recognition command signals;

(c) a reset switch for outputting a reset command signal when turned on;

(d) a first OR gate connected to said speech recognizer for ORing a plurality of recognition command signals outputted from said speech recognizer in response to a plurality of spoken instructions;

(e) a first timer unit connected to said OR gate for outputting a signal for a predetermined time period $T_1$ in response to the ORed signal from said OR gate;

(f) a first AND gate one input terminal of which is connected to the reset switch, the other input terminal of which is connected to said first timer unit for outputting an ANDed signal in response to the reset command signal while said first timer unit is outputting a signal;

(g) a latch circuit provided with a plurality of memory sections, said latch circuit being connected to the vehicle device for storing a plurality of device operating conditions therein in response to the ORed signal from said first OR gate; and (h) a decoder connected to said latch circuit, said output terminals of said speech recognizer, and said first AND gate for decoding a binary code latched in said latch circuit and outputting another binary code corresponding to the latched binary code to the respective output terminals of said speech recognizer in response to the ANDed signal from said first AND gate, whereby an erroneously-operating device can be stopped and returned to its original operating condition on the basis of stored logical vehicle device operating conditions.

13. A spoken-instruction controlled system for an automotive vehicle as set forth in either claim 10, or 11, wherein said vehicle device actuator comprises a plurality of switching elements connected between said speech recognizer and the vehicle device.

14. A spoken-instruction controlled system for an automotive vehicle as set forth in claim 12, wherein said vehicle device actuator comprises:

(a) a plurality of timer units connected to said speech recognizer and said decoder;

(b) a plurality of AND gates connected to said latch memory and said timer units; and (c) a plurality of switching elements connected between said AND gates and said vehicle device.

* * * * *